United States Patent
Eaton et al.

(10) Patent No.: US 7,828,969 B2
(45) Date of Patent: Nov. 9, 2010

(54) LIQUID FILTRATION SYSTEMS

(75) Inventors: Bradley W. Eaton, Woodbury, MN (US); William J. Feil, III, Woodbury, MN (US); Torrence B. Stahl, White Bear Lake, MN (US); Thund Y. Watt, Farmington, MN (US); Mark W. Schimmel, Andover, CT (US)

(73) Assignee: 3M Innovative Properties Company, St. Paul, MN (US)

(*) Notice: Subject to any disclaimer, the term of this patent is extended or adjusted under 35 U.S.C. 154(b) by 561 days.

(21) Appl. No.: 11/835,196

(22) Filed: Aug. 7, 2007

(65) Prior Publication Data

US 2009/0039028 A1    Feb. 12, 2009

(51) Int. Cl.
*B01D 15/00*    (2006.01)

(52) U.S. Cl. .................................. 210/263; 210/282

(58) Field of Classification Search .............. 210/263, 210/282
See application file for complete search history.

(56) References Cited

U.S. PATENT DOCUMENTS

| | | | |
|---|---|---|---|
| 2,988,469 A | 6/1961 | Watson | |
| 3,019,127 A | 1/1962 | Czerwonka et al. | |
| 3,801,400 A | 4/1974 | Vogt et al. | |
| 3,971,373 A | 7/1976 | Braun | |
| 4,103,058 A | 7/1978 | Humlicek | |
| 4,429,001 A * | 1/1984 | Kolpin et al. | 442/340 |
| 4,460,642 A * | 7/1984 | Errede et al. | 442/351 |
| 4,469,734 A | 9/1984 | Minto et al. | |
| 4,741,949 A | 5/1988 | Morman et al. | |
| 4,797,318 A | 1/1989 | Brooker et al. | |
| 4,895,806 A * | 1/1990 | Le et al. | 435/293.1 |
| 4,948,639 A | 8/1990 | Brooker et al. | |
| 5,328,758 A * | 7/1994 | Markell et al. | 442/351 |
| 5,332,426 A | 7/1994 | Tang et al. | |
| 5,639,372 A | 6/1997 | Hagen et al. | |
| 5,792,513 A | 8/1998 | Koslow et al. | |
| 5,882,517 A | 3/1999 | Chen et al. | |
| 5,928,588 A | 7/1999 | Chen et al. | |
| 6,077,588 A | 6/2000 | Koslow et al. | |
| 6,102,039 A | 8/2000 | Springett et al. | |
| 6,234,171 B1 | 5/2001 | Springett et al. | |
| 6,294,090 B1 * | 9/2001 | Nussbaumer et al. | 210/321.83 |
| 6,656,360 B2 * | 12/2003 | Rohrbach et al. | 210/638 |
| 6,840,986 B1 * | 1/2005 | Koslow | 96/135 |
| 7,112,272 B2 | 9/2006 | Hughes et al. | |
| 7,112,280 B2 | 9/2006 | Hughes et al. | |
| 7,169,304 B2 | 1/2007 | Hughes et al. | |
| 7,247,237 B2 * | 7/2007 | Mori et al. | 210/338 |
| 2004/0245171 A1 | 12/2004 | Schimmel | |
| 2005/0272867 A1 * | 12/2005 | Hogge et al. | 525/100 |
| 2006/0096911 A1 | 5/2006 | Brey et al. | |
| 2006/0230731 A1 * | 10/2006 | Kalayci et al. | 55/486 |
| 2007/0175819 A1 | 8/2007 | Schimmel | |
| 2009/0065436 A1 * | 3/2009 | Kalayci et al. | 210/679 |

* cited by examiner

Primary Examiner—Chester T Barry
(74) Attorney, Agent, or Firm—Daniel R. Pastirik (57) ABSTRACT

Provided are filter elements and methods of making and using the same where the filter elements are suitable for liquid filtration and contain particle-loaded meltblown fiber webs. A filter element comprises: a porous article comprising a web of self-supporting nonwoven polymeric fibers and a plurality of sorbent particles enmeshed in the web, the article comprising a first surface and a second surface; a liquid-impermeable housing surrounding the porous article; an inlet in fluid communication with the first surface; and an outlet in fluid communication with the second surface. Spiral-wound webs, web-covered blocks, and stacked disks of webs are also provided.

26 Claims, 4 Drawing Sheets

LIQUID FILTRATION SYSTEMS

TECHNICAL FIELD

The present disclosure relates to liquid filtration systems and filter media, wherein the filter media contains, for example, polymeric fibrous webs containing sorbent components therein.

BACKGROUND

Numerous types of fluid filtration systems, such as for home water filtration, are commercially available. Traditionally, beds of loose carbon particles were used for removing metals and/or organic materials from water. Composite blocks can be made from combinations of sorbent materials, such as adsorbent activated carbon, and polymeric binders, such as polyethylene, that have been sintered together under conditions of heat and pressure and are useful in water filter technology. Carbon block technology, for example, provides comparable functionality to loose bed carbon particles without the particle shedding or taking up too much space. With carbon block technology, pressure drop across the block can increase as a result of increasing quantities of sorptive materials such as activated carbon. Moreover, exposure of carbon blocks to heat and pressure can limit the types of materials available for use in the blocks. For example, carbon block technology is generally precluded from using materials that are sensitive to thermal degradation, such as ion exchange resins.

There is an ongoing need to provide compact water filtration systems for home use. There is also a need to provide systems that have high loadings of active material without increasing pressure drop across the system. It would be further desirable to minimize degradation to filter media during processing. In addition, there is a continuing need to provide systems having improved service life.

SUMMARY

Provided are filter elements and methods of making and using the same where the filter elements are suitable for liquid filtration and contain particle-loaded meltblown fiber webs.

In one aspect, provided is a filter element comprising: a porous article comprising a web of self-supporting nonwoven polymeric fibers and a plurality of sorbent particles enmeshed in the web, the article comprising a first surface and a second surface; a liquid-impermeable housing surrounding the porous article; an inlet in fluid communication with the first surface; and an outlet in fluid communication with the second surface.

Another aspect includes a fluid filtration system comprising a fluid source and a filter element, the filter element comprising: a porous article comprising a web of self-supporting nonwoven polymeric fibers and a plurality of sorbent particles enmeshed in the web, the porous article comprising a first surface and a second surface; a liquid-impermeable housing surrounding the porous article, an inlet in fluid communication with the first surface; and an outlet in fluid communication with the second surface.

In a further aspect, provided is a filter element comprising: a block composite comprising an activated media in an amount in the range of 10 to 90% and a binder in an amount in the range of 10 to 90% by weight of the block; a web surrounding the carbon block composite, the web comprising self-supporting nonwoven polypropylene fibers and a plurality of sorbent particles enmeshed in the web in an amount in the range of 50 to 97% by weight of the web.

In another aspect, a filter element comprising a plurality of disks affixed to each other, the disks comprising self-supporting nonwoven polypropylene fibers and a plurality of sorbent particles enmeshed in the fibers is provided.

Other aspects include methods of filtering a fluid. The method comprises contacting a filter element with the fluid, the filter element comprising a porous article comprising a web of self-supporting nonwoven polymeric fibers and a plurality of sorbent particles enmeshed in the web, the porous article comprising a first surface and a second surface; a liquid-impermeable housing surrounding the porous article, an inlet in fluid communication with the first surface; and an outlet in fluid communication with the second surface.

In further aspects, methods of forming a filter element are provided, the methods comprising: flowing molten polymer through a plurality of orifices to form filaments; attenuating the filaments into fibers; directing a stream of sorbent particles amidst the filaments or fibers; collecting the fibers and sorbent particles as a nonwoven web to form a porous article; and locating the porous article in a liquid-impervious housing.

Before describing several exemplary embodiments of the invention, it is to be understood that the invention is not limited to the details of construction or process steps set forth in the following description. The invention is capable of other embodiments and of being practiced or being carried out in various ways.

DETAILED DESCRIPTION

Provided are filtration articles for liquid purification that utilize particle-loaded meltblown (or blown microfiber—BMF) webs in conjunction with a base to form a liquid treatment unit. These particle loaded BMF webs are formed by adding a sorbent material in the form of particles, particulates, and/or agglomerates or blends of the same to an airstream that attenuates polymeric meltblown fibers and conveys these fibers to a collector. The particles become enmeshed in a meltblown fibrous matrix as the fibers contact the particles in the mixed airstream and are collected to form a web. High loadings of particles (up to, for example, about 97% by weight) are possible. Sorbent materials include, but are not limited to, types of materials that change physical or chemical properties of a fluid such as absorbent and adsorbent materials and materials having surface activity. Examples of sorbents may include, but are not limited to, granular and powdered activated carbon; ion exchange resin; metal ion exchange zeolite sorbents such as Engelhard's ATS; activated aluminas such as Selecto Scientific's Alusil; antimicrobial compounds, for example silver, zinc and halogen based materials; acid gas adsorbents; arsenic reduction materials; iodinated resins; and diatomaceous earth.

Filtration media in accordance with embodiments of the invention include particle loaded webs (uncalendered) and compacted/densified loaded webs (calendered). These media exhibit low resistance to fluid flow and have significant improvements relative to commercial products in, for example, gravity flow, liquid filtration applications. Additional advantages are found in applications requiring high flow rates. The open, porous nature of these loaded webs does not appreciably add to the resistance to flow through the filter and housing. This low pressure drop across the media enables use in high flow applications such as whole house filtration and also for applications requiring gravity flow filtration. Active carbon loadings in excess of 90% by weight have been demonstrated. Loadings of at least 40, 50, 60, 70, or even 80% are also possible. Loaded webs have additional advantages over block technology when using thermally sensitive particulates such as some ion exchange resins. The particles are not exposed to the elevated temperatures seen during the block molding or extrusion processes. This reduces concerns about thermal lability related to particulate (ion exchange resin) degradation. The open, porous structure is also an advantage in high sediment situations. The highly open structure retains many potential pathways for the fluid to contact the particles. In whole house filtration, the desire is for the large sediment particles to be trapped in the media while the smaller sediment particles are permitted to pass through the media. This contributes to higher service life before the media becomes fouled and the pressure drop becomes excessive.

In one aspect, provided is a filter element comprising: a porous article comprising a web of self-supporting nonwoven polymeric fibers and a plurality of sorbent particles enmeshed in the web, the article comprising a first surface and a second surface; a liquid-impermeable housing surrounding the porous article; an inlet in fluid communication with the first surface; and an outlet in fluid communication with the second surface.

In a detailed embodiment, the sorbent particles comprise an activated carbon, diatomaceous earth, an ion exchange resin, a metal ion exchange sorbent, an activated alumina, an antimicrobial compound, an acid gas adsorbent, an arsenic reduction material, an iodinated resin, or combinations thereof.

In another embodiment, the web has a Gurley time of no more than 2 (or in other embodiments 1 or even 0.5) seconds. Other embodiments provide that the filter has a pressure drop of no more than 150 (or in other embodiments 75 or even 30) mm water at a uniform face velocity of air of 5.3 cm per second under ambient conditions. In certain embodiments, the particles have an average particle size of no more than 250 (or 200, 150, 100, or even 60) μm. A detailed embodiment provides that the filter has an average fill rate of less than 10 minutes per gallon.

In one embodiment, the web is wound to form the article. In another embodiment, the article is formed from a plurality of webs adjacent to each other. A detailed embodiment provides that a first web contains a first sorbent and a second web contains a second sorbent. Another embodiment provides that a first web comprises particles of a first average size and a second web comprises particles of a second average size.

In a further embodiment, the web substantially surrounds a core. The core can comprise a carbon block. Other embodiments include the web having a base web weight is in the range of 10 to 1000 (or 20-300 or even 25-100) grams per square meter. In another embodiment, the web has a sorbent particle density in the range of 0.20 to 0.5 g/cc.

In one or more embodiments, the polymeric fibers comprise polypropylene. In some embodiments, the polymeric fibers comprise a metallocene-catalyzed polyolefin. In detailed embodiments, polypropylene has a polymer melt flow index in the range of 30 to 1500 (or 75-750, or even 200-500).

A further embodiment provides that the web has been compressed by calendering, heating, or applying pressure. Other embodiments include the filter element having a sorbent density gradient.

Another aspect includes a fluid filtration system comprising a fluid source and a filter element, the filter element comprising: a porous article comprising a web of self-supporting nonwoven polymeric fibers and a plurality of sorbent particles enmeshed in the web, the porous article comprising a first surface and a second surface; a liquid-impermeable housing surrounding the porous article, an inlet in fluid communication with the first surface; and an outlet in fluid communication with the second surface.

In one embodiment, the web is rolled to form the porous article. In another embodiment, the porous article is formed from a plurality of webs that are adjacent to each other. In a further embodiment, the web substantially surrounds a carbon block.

In a further aspect, provided is a filter element comprising: a block composite comprising an activated media in an amount in the range of 10 to 90% and a binder in an amount in the range of 10 to 90% by weight of the block; a web surrounding the carbon block composite, the web comprising self-supporting nonwoven polypropylene fibers and a plurality of sorbent particles enmeshed in the web in an amount in the range of 50 to 97% by weight of the web.

In another aspect, a filter element comprising a plurality of disks affixed to each other, the disks comprising self-supporting nonwoven polypropylene fibers and a plurality of sorbent particles enmeshed in the fibers is provided. A detailed embodiment provides that a first plurality of disks comprise first sorbent particles of activated carbon and a second plurality of disks comprise second sorbent particles of ion exchange resin.

Other aspects include methods of filtering a fluid. The method comprises contacting a filter element with the fluid, the filter element comprising a porous article comprising a web of self-supporting nonwoven polymeric fibers and a plurality of sorbent particles enmeshed in the web, the porous article comprising a first surface and a second surface; a liquid-impermeable housing surrounding the porous article, an inlet in fluid communication with the first surface; and an outlet in fluid communication with the second surface.

In further aspects, methods of forming a filter element are provided, the methods comprising: flowing molten polymer through a plurality of orifices to form filaments; attenuating the filaments into fibers; directing a stream of sorbent particles amidst the filaments or fibers; collecting the fibers and sorbent particles as a nonwoven web to form a porous article; and locating the porous article in a liquid-impervious housing. In one embodiment, the method further comprises compressing the nonwoven web by calendaring, heating, or applying pressure to form a compressed web having a Gurley time of no more than 2 seconds. In another aspect, the method further comprises affixing a plurality of the nonwoven webs adjacent to each other to form the porous article. Another embodiment provides that the method further comprising winding the nonwoven web prior to placing the nonwoven web in the housing. Other embodiments include controlling the rheology of the fibers.

Reference to "particle-loaded meltblown media" or "web" includes filtration media of an open-structured entangled mass of fibers, for example, microfibers, containing particles enmeshed among the fibers, the particles being sorbent for reducing or removing materials such as chemical contaminants, chlorine, and sediment from water.

Reference to "enmeshed" means that particles are dispersed and physically held in the fibers of the web. Generally, there is point and line contact along the fibers and the particles so that nearly the full surface area of the particles is available for interaction with fluid.

Reference to "sorbent density gradient" means that the amount of sorbent material per square area need not be uniform through out the filter and that it can vary to provide more material in certain areas of the filter and less in other areas. For example, a sorbent density gradient in an axial configuration means that as along the central portion of the filter the amount of sorbent per square area at one end of the filter differs from the amount at the other end and in between two ends but does not vary in the radial direction away from the central portion. On the other hand, a sorbent density gradient in a radial configuration means that as moving away from the central portion of the filter, the core area has a different amount of sorbent as compared to the outer surface of the filter. Variation of density need not be linear, but can vary as needed. For example, density could vary by a single step change, multiple step changes, sinusoidally, and the like.

Reference to "fluid treatment unit" or "fluid filtration system" includes a system containing a filtration media and a method of separating raw fluid, such as untreated water, from treated fluid. This typically includes a filter housing for a filter element and an outlet to pass treated fluid away from the filter housing in an appropriate manner.

The terms particle and particulate are being used substantially interchangeably. Generally, a particle is a small piece or individual part. A particulate pertains to or is formed of particles. The particles used in embodiments of the invention can remain separate or may clump, physically intermesh, electrostatically associate, or otherwise associate to form particulates. In certain instances, agglomerates may be intentionally formed such as those described in U.S. Pat. No. 5,332,426 (Tang et al.).

Reference to "calendering" includes a process of passing a product, such as a polymeric absorbent loaded web through rollers to obtain a compressed material. The rollers may optionally be heated.

The term "Gurley time" refers to the time it takes 50 cc of air at 124 mm (4.88 in.) $H_2O$ pressure to pass through a sample of the web having a circular cross-sectional area of approximately 645 $mm^2$ (1 square inch). A temperature of approximately 23-24° C. (74-76° F.) and 50 percent relative humidity are maintained for consistent measurements. The "Gurley" time may be measured on a densometer of the type sold under the trade designation "Model 4110" densometer by W. & L. E. Gurley of Troy, N.Y., which is calibrated and operated with a Gurley-Teledyne sensitivity meter (Cat. No. 4134/4135). Gurley time is inversely related to void volume of the particle-loaded web. Gurley time is also inversely related to average pore size of the particle-loaded web.

The term "Melt Flow Index" or "MFI", also variously referred to as MFR, or Melt Flow Rate, is defined by test method ASTM 1238. Polypropylene polymers were measured using the "method B" variant of the ASTM 1238 test method.

The term "meltblown process" refers to making fine fibers by extruding a thermoplastic polymer through a die consisting of one or more holes. As the fibers emerge from the die they are attenuated by an air stream that is run more or less in parallel or at a tangent to the emerging fibers.

The term "void volume" refers to a percentage calculated by measuring the weight and volume of a filter—then comparing the filter weight to the theoretical weight a solid mass of the same constituent material of that same volume.

The term "thermal degradation" refers to the effect of heat on a material. For example, certain sorbent particles formed into composite blocks or loaded webs may be susceptible to becoming physically unstable during processing such as sintering or calendaring. With regard to a polymer such as polypropylene, treating of the polymer with heat, alone or in combination with mechanical actions, can cause a scission, cross-linking, and/or chemical changes of polymer chains.

The term "controlled degradation" includes the reduction of molecular weight and the narrowing of the molecular weight distribution of a polymer by a controllable means, such by a specific heat and/or shear input rate or by the introduction of an agent that breaks down the polymer chain and is consumed in the degradation reaction in proportion to a quantity of polymer.

The term "porosity" is a measure of void spaces in a material. Size, frequency, number, and/or interconnectivity of pores and voids contribute the porosity of a material.

The term "controlled rheology" may be defined as the use of radiation, peroxide or other free radical agent to adjust the theological properties (such as viscosity and molecular weight distribution) of certain polyolefins, such as polypropylene, by degradation.

The term "densification" refers to a process whereby fibers which have been deposited either directly or indirectly onto a filter winding arbor or mandrel are compressed, either before or after the deposition, and made to form an area, generally or locally, of lower porosity, whether by design or as an artifact of some process of handling the forming or formed filter. Densification also includes the process of calendering webs.

Particle Loading Process

The particle loading process is an additional processing step to a standard meltblown fiber forming process, as disclosed in, for example, commonly assigned U.S. Patent Publication No. 2006/0096911, incorporated herein by reference. Blown microfibers (BMF) are created by a molten polymer entering and flowing through a die, the flow being distributed across the width of the die in the die cavity and the polymer exiting the die through a series of orifices as filaments. In one embodiment, a heated air stream passes through air manifolds and an air knife assembly adjacent to the series of polymer orifices that form the die exit (tip). This heated air stream can be adjusted for both temperature and velocity to attenuate (draw) the polymer filaments down to the desired fiber diameter. The BMF fibers are conveyed in this turbulent air stream towards a rotating surface where they collect to form a web.

Desired particles, such as adsorbent particles, of, for example, activated carbon particles or ion exchange resin beads, are loaded into a particle hopper where they gravimetrically fill recessed cavities in a feed roll. A rigid or semi-rigid doctor blade with segmented adjustment zones forms a controlled gap against the feed roll to restrict the flow out of the hopper. The doctor blade is normally adjusted to contact the surface of the feed roll to limit particulate flow to the volume that resides in the recesses of the feed roll. The feed rate can then be controlled by adjusting the speed that the feed roll turns. A brush roll operates behind the feed roll to remove any residual particulates from the recessed cavities. The particulates fall into a chamber that can be pressurized with compressed air or other source of pressured gas. This chamber is designed to create an airstream that will convey the particles and cause the particles to mix with the meltblown fibers being attenuated and conveyed by the air stream exiting the meltblown die.

By adjusting the pressure in the forced air particulate stream, the velocity distribution of the particles is changed. When very low particle velocity is used, the particles may be diverted by the die airstream and not mix with the fibers. At low particle velocities, the particles may be captured only on the top surface of the web. As the particle velocity increases, the particles begin to more thoroughly mix with the fibers in the meltblown airstream and can form a uniform distribution in the collected web. As the particle velocity continues to increase, the particles partially pass through the meltblown airstream and are captured in the lower portion of the collected web. At even higher particle velocities, the particles can totally pass through the meltblown airstream without being captured in the collected web.

In another embodiment, the particles are sandwiched between two filament airstreams by using two generally vertical, obliquely-disposed dies that project generally opposing streams of filaments toward the collector. Meanwhile, sorbent particles pass through the hopper and into a first chute. The particles are gravity fed into the stream of filaments. The mixture of particles and fibers lands against the collector and forms a self-supporting nonwoven particle-loaded nonwoven web.

In other embodiments, the particles are provided using a vibratory feeder, eductor, or other techniques known to those skilled in the art.

In many applications, substantially uniform distribution of particles throughout the web is desired. There may also be instances where non-uniform distributions may be advantageous. Gradients through the depth of the web may create changes to the pore size distribution that could be used for depth filtration. Webs with a surface loading of particles could be formed into a filter where the fluid is exposed to the particles early in the flow path and the balance of the web provides a support structure and means to prevent sloughing of the particles. The flow path could also be reversed so the meltblown web can act as a pre-filter to remove some contaminants prior to the fluid reaching the active surface of the particles.

In a further embodiment, the collector can comprise a cartridge winding mechanism operative to either make individual filters formed on a winding mandrel or on a rotating cantilevered shaft equipped with some sort of filter cartridge extraction device designed to substantially continuously pull/push the forming filter cartridge from the rotating shaft.

Polymer Rheology Control

Controlled rheology of polymers used for the meltblown fibers can tailor webs to have desirable properties. This is discussed by commonly assigned U.S. patent application Publication Nos. 2004/0245171 and 2007/0175819 (Schimmel) which are incorporated herein by reference in their entireties. For example, adjusting the viscosity of, for example, polypropylene may increase strength of the web. A high degree of fiber to fiber bonding is desirable such that the filter can be machined into useful shapes such as grooved cylinders while maintaining good flow characteristics and high void volumes.

With regard to polypropylene, controlled degradation of a polypropylene starting material characterized by a low MFI (high molecular weight) results in a modified polypropylene that possesses desirable properties for use in fabricating particle-loaded meltblown webs.

In one embodiment, webs are fabricated from a polypropylene polymer using controlled degradation to provide material exhibiting a melt flow index of about 30 to about 1500 (or in other embodiments, 75 to 750, or even 200 to 500).

In another exemplary embodiment of the present disclosure, in order to produce a polypropylene polymer exhibiting a melt flow index of about 35 to about 350, controlled degradation is carried out thermally, with or without the use of oxygen, via radiation, or by the action of free radicals generated by one or more of various reagents such as peroxides when heated. The advantageous modification of the rheology and physical properties of the polypropylene are thus realized by controlled degradation of the polymer.

Figure 1:
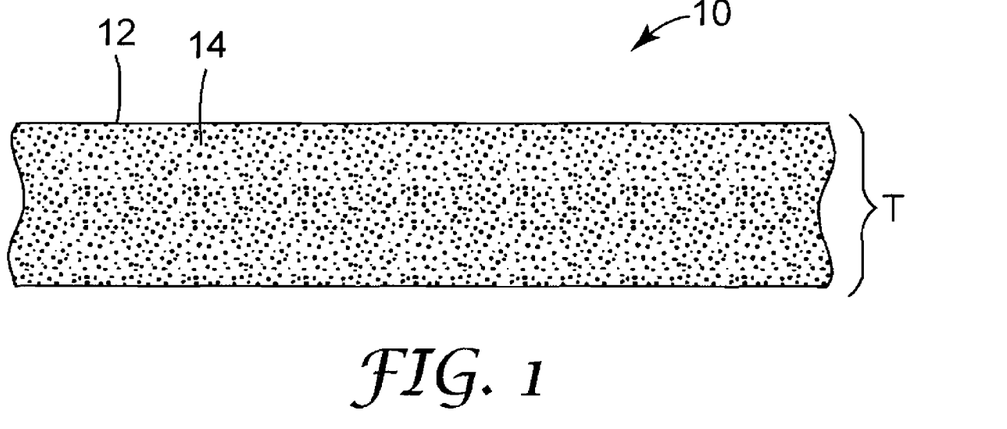
FIG. 1 is a schematic cross-sectional view of a porous article.

Referring to FIG. 1, a porous article 10 is shown schematically in cross-section. Article 10 has a thickness T and a length and width of any desired dimension. Article 10 is a nonwoven web containing entangled polymeric fibers 12 and sorbent particles 14 enmeshed in the web. Small connected pores (not identified in FIG. 1) in article 10 permit water or other fluids to pass (e.g., to flow) through the thickness dimension of article 10. Particles 14 modify fluids passing through, for example, absorbing, adsorbing, or otherwise modifying contaminants and particulates present in such fluids.

Figure 2:
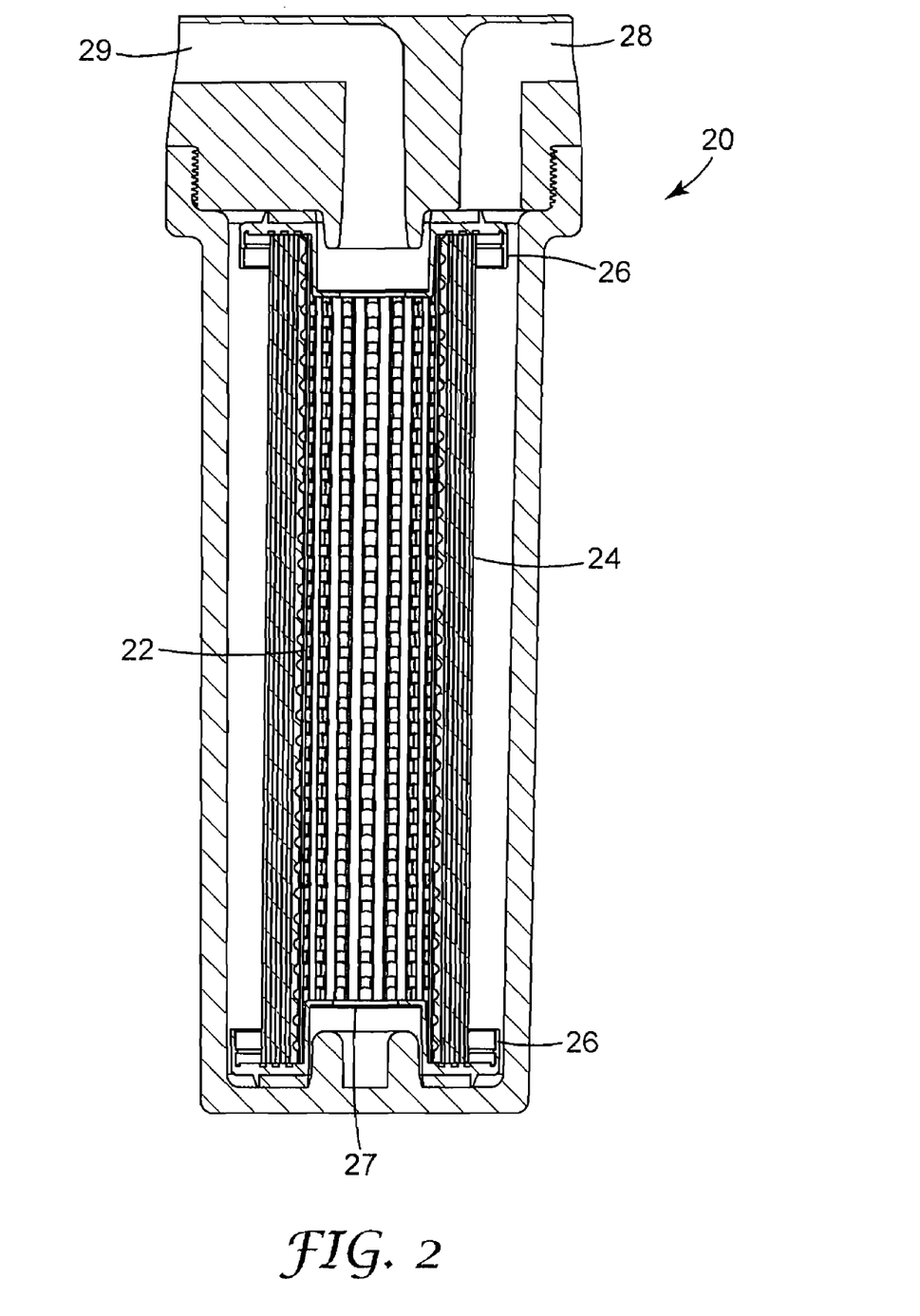
FIG. 2 is a cross-sectional view of a porous article located in a housing.

FIG. 2 is a cross-sectional view of a housing 20 that contains a filter element comprising a porous webbed article 24 disposed on a porous core 22. End caps 26 are affixed to the web 24 with, for example, adhesive (not shown). An inlet 28 to the housing 20 directs a fluid, such as water, to the web 24, where the fluid contacts the sorbent particles enmeshed in the web, and is treated. The treated fluid passes into a channel 27 defined by the core 22. Treated fluid then exits the housing via an outlet 29.

Figure 3:
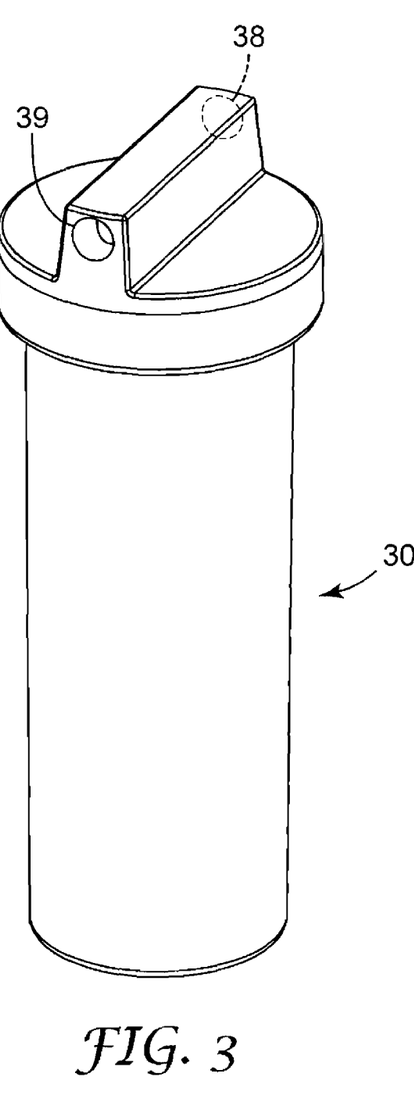
FIG. 3 is a schematic of a housing.

FIG. 3 shows a schematic of a housing 30 having an inlet 38 and an outlet 39. This housing is suitable for filter elements embodied by the present invention.

Figure 4:
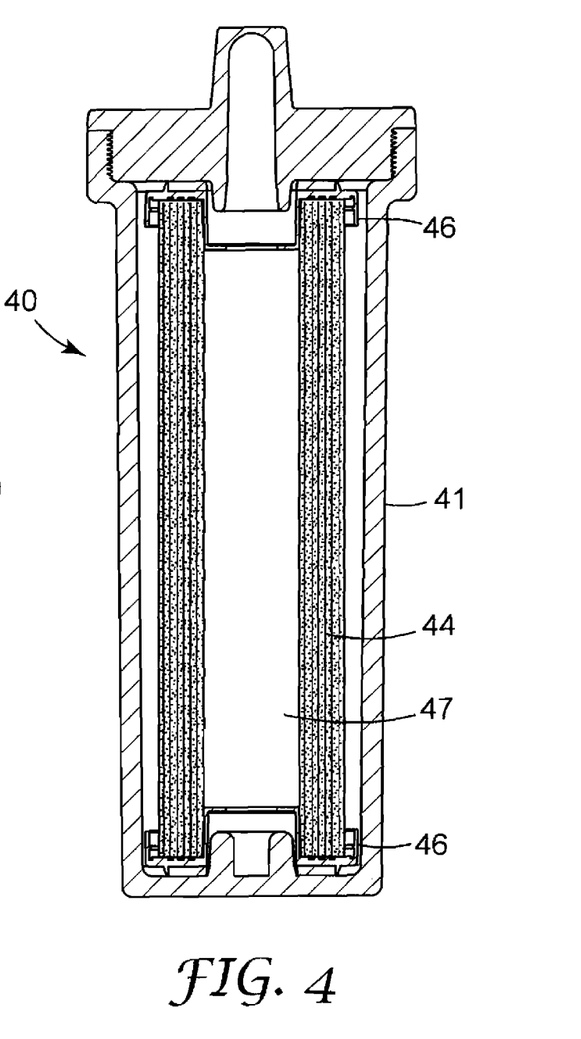
FIG. 4 is a cross-sectional view of a spiral wound porous article located in a housing.

FIG. 4 shows a cross-sectional view of a housing 40 having a wall 41 that contains a filter element comprising a spiral wound porous webbed article 44 having a channel 47. End caps 46 are affixed to the web 44 with, for example, adhesive (not shown). A fluid, such as water, enters the web 44 and contacts the sorbent particles enmeshed in the web, and is treated. The treated fluid passes into the channel 47 defined by the core 22.

Figure 5:
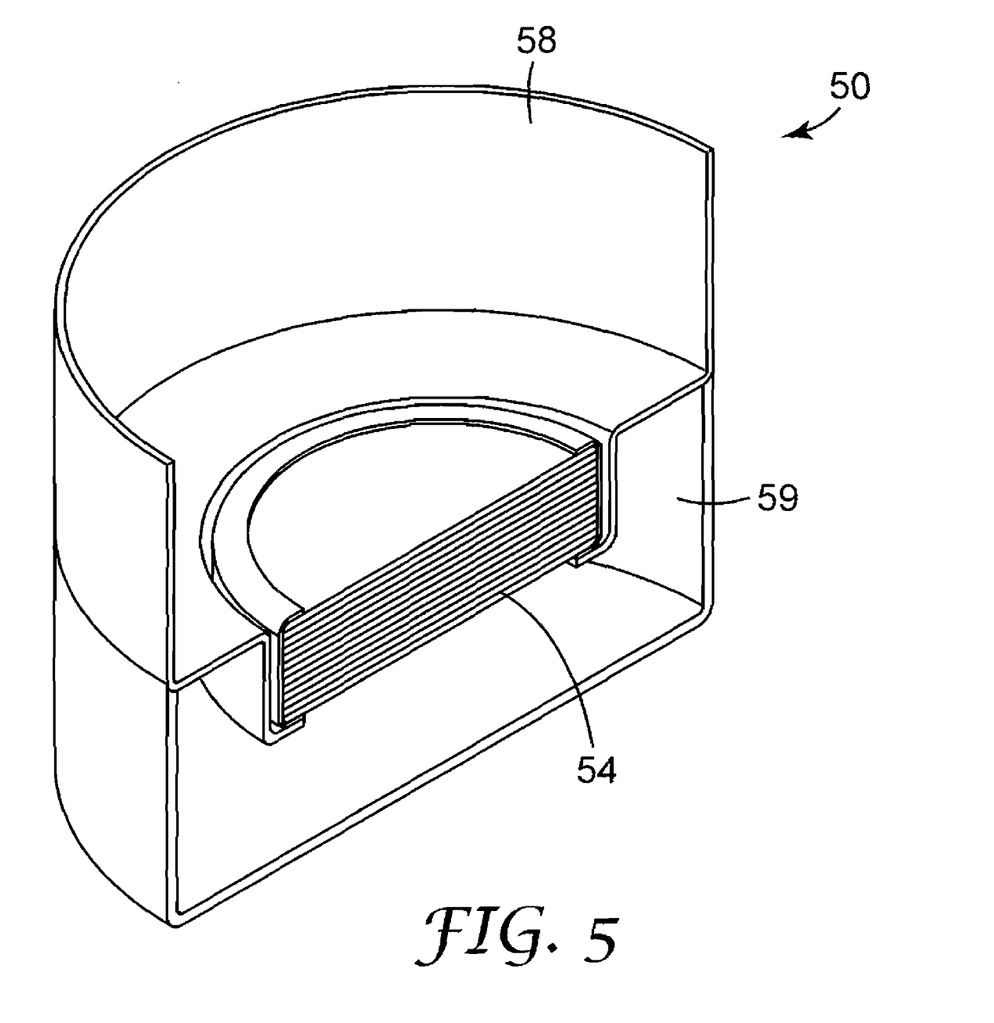
FIG. 5 is a cross-sectional view of a stacked disk filter located in a housing.

FIG. 5 shows a cross-sectional view of stacked disks of webbed materials 54 located in a housing 50 having an inlet 58 to the disks. A fluid contacts the stacked disks 54 and a reservoir 59 collects treated fluid.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

Example 1

A series of screening experiments was conducted to characterize performance of particle-loaded meltblown webs for water purification applications. Two types of base resins were used: 350 MFI polypropylene sold under the trade name Type 3960 (available from Total Petrochemicals) and 80 MFI metallocene-catalyzed polypropylene sold under the trade name Vistamaxx 2125 (available from ExxonMobil). Several particle size grades of coconut shell activated carbon sold under the trade name NC506 (available from PICA) were evaluated. Additional example webs using wood-based carbon sold under the trade name Nuchar Aquaguard (available from Mead Westvaco), coconut shell carbon with titanium silicate coating sold under the trade name ATC N60260 (available from Calgon,), coconut shell carbon sold under the trade name YPC 100MD (available from Kuraray), and cation exchange resin sold under the trade name Dowex HCR-S (available from Dow Chemical) were included for specific tests.

Short yardage rolls of approximately 10 inch (25.4 cm) wide-loaded-web were collected under the conditions as follows. The polymer was extruded through a 10 inch (25.4 cm) wide drilled orifice die (DOD) at 8 lb/hr (3.6 kg/hr) for the polypropylene-based webs and 6.5 lb/hr (3.0 kg/hr) for the metallocene-catalyzed-polypropylene-based webs. The die-to-collector distance was 12 inches (31.0 cm). Samples of the base web (no loaded particulates) were collected at the targeted basis weight and evaluated for effective fiber diameter (EFD) according to the method set forth in Davies, C. N., "The Separation of Airborne Dust and Particles," Institution of Mechanical Engineers, London Proceedings 1B, 1952. The air temperature and velocity were adjusted to achieve the targeted effective fiber diameter. The melt temperature was recorded for the various samples.

After adjusting the base web conditions to reach the targeted basis weight and effective fiber diameter, the particulate was added to the particle loader hopper and the feed roll speed adjusted to deliver the desired loading of absorbent (carbon or ion exchange resin). The air pressure into the particle loader chamber was set between 0.5 and 2 psig (3.4 and 13.8 kPa, respectively). The setting was adjusted to target a uniform distribution of particles throughout the web. Basis weight was reported in grams per square meter (gsm). Base web refers to the weight per square meter of the meltblown fiber web (unloaded). Loaded web refers to the weight per square meter of the meltblown fiber web loaded with media particles.

TABLE 1

| Sample | Media Particle Size | Polymer | Melt Temp °C. | Effective Fiber Diameter (microns) | Basis wt (gsm) of base web/ loaded web |
|---|---|---|---|---|---|
| 1 | Coconut Shell Carbon 20 × 50 | Metallocene pp | 261 | 18.8 | 50/564 |
| 2 | Coconut Shell Carbon 20 × 50 | Metallocene pp | 260 | 18.8 | 50/390 |
| 3 | Coconut Shell Carbon 60 × 100 | Metallocene pp | 261 | 18.8 | 50/527 |
| 4 | Coconut Shell Carbon 60 × 100 | Metallocene pp | 261 | 18.8 | 50/400 |
| 5 | Coconut Shell Carbon 60 × 140 | Polypropylene | 310 | 8.7 | 52/360 |
| 6 | Coconut Shell Carbon 60 × 140 | Polypropylene | 310 | 8.7 | 52/525 |
| 7 | Coconut Shell Carbon 60 × 140 | Polypropylene | 267 | 12.9 | 47/532 |
| 8 | Coconut Shell Carbon 60 × 140 | Polypropylene | 265 | 12.9 | 47/365 |
| 9 | Coconut Shell Carbon 60 × 140 | Polypropylene | 238 | 17.9 | 51/354 |
| 10 | Coconut Shell Carbon 60 × 140 | Polypropylene | 238 | 17.9 | 51/558 |
| 11 | Coconut Shell Carbon 60 × 140 | Metallocene pp | 267 | 15.4 | 54/562 |
| 12 | Coconut Shell Carbon 60 × 140 | Metallocene pp | 267 | 15.4 | 54/363 |
| 13 | Coconut Shell Carbon 80 × 325 | Polypropylene | 310 | 8.7 | 52/361 |
| 14 | Coconut Shell Carbon 80 × 325 | Polypropylene | 310 | 8.7 | 52/568 |
| 15 | Coconut Shell Carbon 80 × 325 | Polypropylene | 266 | 12.9 | 47/367 |
| 16 | Coconut Shell Carbon 80 × 325 | Polypropylene | 239 | 17.9 | 51/325 |
| 17 | Coconut Shell Carbon 80 × 325 | Metallocene pp | 267 | 15.4 | 54/521 |
| 18 | Coconut Shell Carbon 80 × 325 | Metallocene pp | 266 | 15.4 | 54/361 |
| 19 | Coconut Shell Carbon 60 × 100 | Metallocene pp | * | 14.4 | 52/509 |

TABLE 1-continued

| Sample | Media Particle Size | Polymer | Melt Temp °C. | Effective Fiber Diameter (microns) | Basis wt (gsm) of base web/ loaded web |
|---|---|---|---|---|---|
| 20 | Coconut Shell Carbon 60 × 140 | Metallocene pp | * | 14.4 | 52/475 |
| 21 | Coconut Shell Carbon 50 × 200 | Metallocene pp | * | 14.4 | 52/460 |
| 22 | Coconut Shell Carbon 60 × 140 | Polypropylene | * | 8.7 | 52/565 |
| 23 | Coconut Shell Carbon 50 × 200 | Polypropylene | * | 8.7 | 52/570 |
| 24 | Coconut Shell Carbon 80 × 325 | Polypropylene | * | 8.7 | 52/425 |
| 25 | Coconut Shell Carbon w/titanium silicate coating 20 × 50 | Metallocene pp | 265 | 19.3 | 50/550 |
| 26 | Wood-based Carbon 80 × 325 | Metallocene pp | 265 | 19.3 | 53/580 |
| 27 | Coconut Shell Carbon 80 × 200 | Metallocene pp | 265 | 19.3 | 53/560 |
| 28 | Cation Exchange Resin | Metallocene pp | 263 | 16.2 | 52/530 |

* Estimated 265 C.

Example 2

Certain webs from Example 1 were selected to evaluate the impact of calendering on performance. A calender with an adjustable gap between smooth chromed steel rolls was used. Calender pressure for the samples was 60 psi (414 kPa) and speed of the rolls was 5 feet per minute (1.5 meters/min). The rolls were 10 inches (25.4 cm) in diameter and had 22 inches (56 cm) wide roll faces. Each roll weighed about 600 pounds (272 kg) when filled with the oil used for controlling temperature by the Sterlco system. Cylinders having a 5 inch (13 cm) ID were used to apply a nip pressure.

Air pressure drop across the particle loaded web was measured on the calendered webs and the corresponding input web samples. The air pressure drop was measured at room temperature (approximately 22° C.) at one atmosphere (101 kPa) ambient pressure with a uniform face velocity of 5.3 cm/sec for the air flow.

TABLE 2

| Sample | Input Web | Calender Temp °F. (°C.) | Calender Gap mils (mm) | Initial Caliper mils (mm) | Final Caliper mils (mm) | Final Basis wt gsm | Air Pressure Drop mm H₂O |
|---|---|---|---|---|---|---|---|
| 29 | 3 | 150 (66) | 40 (1.0) | 97.6 (2.5) | 50.0 (1.3) | — | — |
| 30 | 3 | 150 (66) | 29 (0.74) | 97.6 (2.5) | 44.0 (1.1) | 429 | 3.17 |
| 31 | 3 | 150 (66) | 17 (0.43) | 97.6 (2.5) | 30.0 (0.8) | — | — |
| 32 | 3 | 150 (66) | 12 (0.31) | 97.6 (2.5) | 28.0 (0.7) | 428 | 14.00 |
| 33 | 6 | 150 (66) | 29 (0.74) | 151.0 (3.8) | 64.0 (1.6) | 535 | 7.30 |
| 34 | 14 | 150 (66) | 29 (0.74) | 133.0 (3.4) | 55.0 (1.4) | 541 | 30.20 |
| 35 | 3 | 175 (79) | 29 (0.74) | 97.6 (2.5) | 45.0 (1.1) | 452 | 3.21 |
| 36 | 3 | 200 (93) | 29 (0.74) | 97.6 (2.5) | 40.0 (1.0) | 388 | 2.10 |
| 37 | 14 | 200 (93) | 29 (0.74) | 133.0 (3.4) | 46.0 (1.2) | 526 | 24.70 |
| 38 | 20 | 175 (79) | 29 (0.74) | 99.0 (2.5) | 44.2 (1.1) | 429 | 3.55 |
| 39 | 20 | 175 (79) | 12 (0.31) | 99.0 (2.5) | 33.1 (0.8) | 396 | 15.55 |
| 40 | 24 | 175 (79) | 29 (0.74) | 103.0 (2.6) | 47.2 (1.2) | 411 | 10.03 |
| 41 | 25 | 175 (79) | 29 (0.74) | 117.0 (3.0) | 52.5 (1.3) | 495 | 1.33 |
| 42 | 26 | 175 (79) | 29 (0.74) | 167.5 (4.3) | 77.5 (2.0) | 513 | 28.05 |

TABLE 2-continued

| Sample | Input Web | Calender Temp °F. (°C.) | Calender Gap mils (mm) | Initial Caliper mils (mm) | Final Caliper mils (mm) | Final Basis wt gsm | Air Pressure Drop mm H₂O |
|---|---|---|---|---|---|---|---|
| 43 | 26 | 175 (79) | 12 (0.31) | 167.5 (4.3) | 70.5 (1.8) | 481 | 25.71 |
| 44 | 27 | 175 (79) | 29 (0.74) | 105.0 (2.7) | 49.0 (1.2) | 474 | 6.12 |
| 45 | 27 | 175 (79) | 12 (0.31) | 105.0 (2.7) | 34.0 (0.9) | 395 | 16.90 |
| 3 | 3 | Untreated | — | 97.6 (2.5) | 97.6 (2.5) | 506 | 0.82 |
| 6 | 6 | Untreated | — | 151.0 (3.8) | 151.0 (3.8) | 580 | 1.99 |
| 14 | 14 | Untreated | — | 133.0 (3.4) | 133.0 (3.4) | 550 | 3.58 |
| 20 | 20 | Untreated | — | 99.0 (2.5) | 99.0 (2.5) | 475 | 1.07 |
| 24 | 24 | Untreated | — | 103.0 (2.6) | 103.0 (2.6) | 425 | 2.79 |
| 25 | 25 | Untreated | — | 117.0 (3.0) | 117.0 (3.0) | 618 | 0.49 |
| 26 | 26 | Untreated | — | 167.5 (4.3) | 167.5 (4.3) | 570 | 3.90 |
| 27 | 27 | Untreated | — | 105.0 (2.7) | 105.0 (2.7) | 569 | 1.91 |

The webs did not stick to the calender rolls under the evaluated conditions. The webs did increase in total width and possibly length, especially at the higher temperatures. Web density improved compared to uncalendered webs. The basis weights of the webs are included to account for the changes in dimensions after calendering.

Example 3

Some samples of Examples 1 and 2 were assembled into filters as follows. For each sample, a length of web required to obtain a filter that contained approximately 100 grams of media was calculated from a weight obtained of a section of web of an approximate size of 8 inch (20 cm) W×12 inch (30.5 cm). A core of a rigid tube of approximate dimensions of 1.45 inch (3.7 cm) OD and 13.9 inch (35.3 cm) length was obtained. The tube contained openings of approximately 0.15 inch (0.38 cm) square throughout the tube. The calculated length of web to deliver 100 grams of media was cut from the full width—nominally 10 inch (25 cm) sample roll. Webs of approximately 3-4 feet (91 cm-122 cm) long (depending on loading) generally resulted in an approximately 100 gram loading when cut to an 8 inch (20 cm) length. The web was glued to the OD of the tube. The web was wrapped around the tube for the appropriate length. The outside edge of the web was glued to the inner layer of the web. The tube was cut on one end at a point where good loading was visible. The other end was cut to yield a filter that was approximately 8 inches (20.3 cm) in length. The ends of the filter were potted in end caps.

The filters were on average 2.7 inch (6.9 cm) OD. The range in OD was 2.41 inch-2.88 inch (6.1 cm-7.3 cm). This OD resulted in an average media loading of 106 grams with a range of 99-114 grams. The web-based filters using uncalendered webs had an average density of 0.20 g/cc of active media.

Calendering of the carbon-loaded webs resulted in denser filter structures. As a result, the use of calendered webs reduced the volume of material needed for the filters, enabling usage of small filter dimensions. The density of the filters using calendered webs ranged from 0.37 g/cc to 0.50 g/cc. The highest density of the calendered web (Sample 4) resulted in 0.45 g/cc of active media.

Example 4

Testing

Some filters formed according to Example 3 were evaluated according to performance tests, including initial flush turbidity, clean pressure drop, chlorine reduction, particulate reduction, gram life test, and Gurley value.

For initial flush turbidity, a filter was connected to a city water supply and the first water through the filter was collected. The method is based on a comparison of the intensity of light scattered by the sample under defined conditions with the intensity of light scattered by a standard reference under the same conditions. A higher amount of scattered light indicates a higher level of turbidity in the water. The data was reported in Nephelometric Turbidity Units or NTU. Levels<0.5 NTU meet NSF/ANSI drinking water standards. The first liter was collected from the effluent stream. The turbidity was measured and recorded. The samples were then allowed to flow at 0.75 gpm (2.8 liters/minute) and additional samples were collected at 1 gallon (3.8 liters), 5 gallons (19 liters), and 10 gallons (38 liters), and the turbidity was measured at each sample point. Data is included for Comparison 1, a composite carbon block having a formulation of 55% activated carbon media and 45% polymer binder, and Comparison 2, a carbon filter formed from granular activated carbon (GAC).

TABLE 3

| Sample | 1ˢᵗ Liter (NTU) | 1 Gallon (NTU) | 5 Gallon (NTU) | 10 Gallon (NTU) |
|---|---|---|---|---|
| Comparison 1 | 4.68 | — | — | — |
| Comparison 2 | 124.5 | — | — | — |
| 1 | 25.7 | 1.47 | 0.2 | 0.12 |
| 2 | 12.2 | 1.64 | 0.18 | 0.12 |
| 3 | 32.8 | 3.15 | 0.3 | 0.15 |

TABLE 3-continued

| Sample | 1st Liter (NTU) | 1 Gallon (NTU) | 5 Gallon (NTU) | 10 Gallon (NTU) |
|---|---|---|---|---|
| 4 | 1.28 | 0.13 | 0.11 | 0.18 |
| 5 | 16.9 | 2.8 | 0.68 | 0.16 |
| 6 | 25.1 | 2.66 | 1 | 0.3 |
| 7 | 5.92 | 1.22 | 0.33 | 0.23 |
| 8 | 8.21 | 2.66 | 0.69 | 0.42 |
| 9 | 21.6 | 1.24 | 0.43 | 0.67 |
| 10 | 19.5 | 5.62 | 1.67 | 0.59 |
| 11 | 19.5 | 3.79 | 0.55 | 0.17 |
| 12 | 10.9 | 0.34 | 0.31 | 0.35 |
| 13 | 47.1 | 5.96 | 1.07 | 0.44 |
| 14 | 83.4 | 21.5 | 5.92 | 1.8 |
| 15 | 136 | 15.6 | 2.13 | 0.98 |
| 16 | 250 | 17.5 | 3.24 | 1.23 |
| 17 | 56.3 | 10.1 | 2.12 | 0.36 |
| 18 | 34.1 | 1.46 | 0.56 | 0.23 |
| 30 | 43.3 | 0.71 | 0.41 | 0.19 |
| 32 | 47.7 | 1.04 | 0.34 | 0.47 |
| 33 | 59 | 4.44 | 0.37 | 0.21 |
| 34 | 22.4 | 3.32 | 0.57 | 0.18 |
| 35 | 20.6 | 0.51 | 0.15 | 0.3 |
| 36 | 25.4 | 0.47 | 0.31 | 0.61 |
| 37 | 45.2 | 6.71 | 1.72 | 0.13 |

With reference to Table 3, the loaded webs shed carbon fines during the initial 0-5 gallons of flow. Web capture was better with larger carbon particles as compared to smaller particles. The fines appeared to be reduced between gallons 1 through 5. The amount of shedding was less than a standard GAC axial flow filter, (except samples 15 and 16); even with particles in the 80×325 mesh size.

The calendering did not increase the initial flush turbidity. Further, the calendering appears to have reduced the initial turbidity, especially with the 80×325 carbon.

For clean pressure drop, a filter was connected to a city water supply with a calibrated pressure gauge immediately preceding the system. The filter was open to the atmosphere at the exit of the system. The city water was fed through a rotometer capable of measuring the flow rate at the desired rates of 0.25, 0.50, 0.75, 1.0, 2.0, 3.0 and 4.0 gallons per minute, which correspond to 0.9, 1.9, 2.8, 3.8, 7.6, 11.4, 15.1 liters/minute, respectively. The pressure drop of the system with and without the media was evaluated at various flow rates. The system without media is identified as Comparison 3.

TABLE 4

| Sample No. | 0.25 gpm psi | 0.50 gpm psi | 0.75 gpm Psi | 1.0 gpm psi | 2.0 gpm psi | 3.0 gpm psi | 4.0 gpm psi |
|---|---|---|---|---|---|---|---|
| Comparison 3 | 0 | 0 | 2 | 3 | 14 | 31 | 56 |
| 1 | 0 | 0.5 | 1 | 3 | 15 | 30 | 53 |
| 2 | 0 | 1 | 1 | 2 | 14 | 31 | 56 |
| 3 | 1 | 1 | 2 | 4 | 18 | 33 | 58 |
| 4 | 1 | 1 | — | 4 | 18 | 30 | 58 |
| 5 | 0 | 0 | 2 | 3 | 13 | 30 | 56 |
| 6 | 0 | 0 | 1 | 3 | 15 | 32 | 57 |
| 7 | 0 | 1 | 2 | 4 | 15 | 32 | 56 |
| 8 | 0 | 1 | 2 | 3 | 14 | 32 | 54 |
| 9 | 0 | 1 | 2 | 3 | 16 | 31 | 56 |
| 10 | 0 | 1 | 2 | 4 | 16 | 32 | 57 |
| 11 | 0 | 1 | 2 | 3 | 16 | 31 | 56 |
| 12 | 0 | 0 | 2 | 3 | 15 | 32 | 58 |
| 13 | 0 | 0 | — | 3 | 15 | 25 | 57 |
| 14 | 0 | 0 | 1 | 2 | 14 | 31 | 55 |
| 15 | 0 | 1 | 2 | 4 | 15 | 31 | 58 |
| 16 | 0 | 0 | 1 | 4 | 14 | 32 | 57 |
| 17 | 0 | 0 | 2 | 4 | 16 | 32 | 56 |
| 18 | 0 | 1 | 2 | 4 | 15 | 31 | 56 |
| 30 | 0 | 0 | 2 | 3 | 14 | 32 | 57 |
| 32 | 0 | 1 | 2.5 | 4 | 16 | 34 | 61 |
| 33 | 0 | 0.5 | 2 | 4 | 17 | 33 | 60 |
| 34 | 0 | 1 | 3 | 5 | 17 | 35 | 60 |
| 35 | 1 | 1 | 3 | 4.5 | 16 | 31 | 58 |
| 36 | 0 | 1 | 3 | 5 | 16 | 33 | 58 |
| 37 | 0 | 1 | 3 | 5 | 17 | 37 | 62 |

With reference to Table 4, in all cases, the observed pressure drop for the system plus the loaded web filters was within 6 psi (41.4 kPa) of the system pressure drop for the system and sump with out a filter installed. There was no appreciable contribution to total pressure drop from the web filter. No evidence of damage to the filter was observed during this testing.

The uncalendered Sample 17 web media was removed from the filter retained from the pressure drop testing. A Scanning Electron Microscope was used to measure the size of the particles that were retained after the high pressure testing. This filter showed retention of particles having a size of 60-65 microns and larger. Calendering the web, the use of finer fiber diameters or other techniques that reduce the intersticial spaces or form adhesion or bonds between the particles and the fibers should increase retention of even finer particle sizes.

For NSF/ANSI 42 Chlorine Reduction Test, the filter was challenged at a flow rate of 0.8 gallons/minute (3.024 L/min) with an influent challenge concentration of 2.0 mg/L free available chlorine (FAC) with water that contained a specified pH, turbidity, total organic carbon and water hardness. To obtain a chlorine reduction claim, the filter must meet a minimum of 50% reduction or a maximum of 1.0 mg/L free available chlorine in the effluent. A comparison block, referred to as "Comparison 4" was a carbon block having dimensions of 6.395 inches (16.2 cm) in length, 1.5 inches (3.8 cm) OD, 0.375 inch (0.95 cm) ID and containing 60% by weight 80×325 PICA NC506 carbon and 40% polyethylene binder as described in U.S. Pat. No. 7,112,272 (Hughes et al.). An end cap was adhesively bonded directly to the open end of the carbon block. Percent reduction was reported in Table 5.

TABLE 5

| Sample No. | After 1 gal % Red. | 1000 gal % Red. | 2000 gal % Red. | 3000 gal % Red. | 4000 gal % Red. | 5000 gal % Red. |
|---|---|---|---|---|---|---|
| Comparison 4 | 99.3 | 96.3 | 86.2 | 73.5 | 70.1 | 63.9 |
| 20 | 99.0 | 95.4 | 94.1 | 91.0 | 87.7 | 86.1 |
| 22 | 99.0 | 97.5 | 96.5 | 95.0 | 93.9 | 94.4 |
| 24 | 99.3 | 99.1 | 99.0 | 97.6 | 97.2 | 96.8 |
| 25 | 41.0 | 38.8 | 31.0 | 27.1 | 32.9 | 28.2 |

TABLE 5-continued

| Sample No. | After 1 gal % Red. | 1000 gal % Red. | 2000 gal % Red. | 3000 gal % Red. | 4000 gal % Red. | 5000 gal % Red. |
|---|---|---|---|---|---|---|
| 38 | 99.0 | 95.5 | 92.4 | 88.1 | 85.6 | 84.1 |
| 39 | 99.3 | 94.9 | 91.3 | 87.8 | 88.3 | 78.2 |
| 40 | 99.3 | 99.1 | 96.9 | 95.1 | 94.9 | 93.0 |
| 41 | 55.1 | 38.9 | 33.5 | 28.7 | 34.7 | 29.6 |
| 44 | 99.4 | 98.9 | 99.0 | 93.9 | 94.8 | 86.5 |
| 45 | 99.4 | 97.8 | 96.5 | 92.5 | 91.9 | 86.1 |

With reference to Table 5, because the filter samples were prepared with a fixed mass of media, similar results were obtained between the calendered and uncalendered samples in the chlorine reduction test.

For NSF/ANSI 42 Particulate Reduction Test, the filter was challenged at an initial flow rate of ~2.5 gallon/minute (9.5 L/min.) with an influent challenge concentration of ~1,000,000 particles using an in-line particle counter for Class III testing. According to the NSF/ANSI 42 standard, a system shall reduce the number of particles in the test particle size range by at least 85% when tested according to the standard in order to receive a specific class rating. The system's rating shall be consistent with the smallest particle size effectively removed as determined by the test. A claim for a greater percent reduction, if made, shall be substantiated by testing. Comparison 4 was also tested.

TABLE 6

| Sample | Class Rating/ Micron Rating | $1^{st}$ Cycle Eff. | $4^{th}$ Cycle Eff. | 25% Red. Eff. | 50% Red. Eff. | 75% Red. Eff. | Avg. % Red |
|---|---|---|---|---|---|---|---|
| Comparison 4 | III 5-15 | >85 | — | 96.2 | >99.8 | >99.9 | 96.2 |
| 39 | III 5-15 | >97.3 | 78.6 | 79.7 | 25.0 | >97.1 | 61.1 |
| 40 | III 5-15 | 99.7 | >99.5 | >98.9 | >99.3 | >99.8 | 99.8 |

With reference to Table 6, the calendered samples 39 and 40 show improved particulate removal as compared to the comparative carbon block.

For the gram life test, a filter was exposed to an aqueous solution of AC Coarse Test Dust at a fixed concentration of 1 gram test dust per gallon. The end point was determined by a 20 psi (6.9 kPa) change in pressure drop across the media. The number of gallons through the filter to the defined endpoint was reported. A higher gram life indicates a longer service life as measured using this test dust. Comparison 4 was also tested.

TABLE 7

| Sample | Gram Life in gallons (liters) |
|---|---|
| Comparison 4 | 25 (95) |
| Comparison 4 (repeat) | 180 (681) |
| 20 | >1000 (>3785) |
| 38 | 150 (568) |
| 39 | 55 (208) |
| 24 | 500 (1893) |
| 40 | 130 (492) |

With reference to Table 7, the uncalendered samples 20 and 24 showed the highest gram life results by more than 2.5 times to as much as 40 times the comparison block.

For the Gurley Value Test, as described in U.S. Pat. No. 5,328,758 (Markell), a Gurley Model 4110 densometer was used to measure the time for 50 cc of air at 124 mm water pressure to pass through a sample of web having an area of approximately 645 square mm (1 square inch) at room temperature (approximately 23° C.). The samples provided in Table 4 represent a range of pressure drops shown in Table 2.

TABLE 8

| Sample | Gurley Value sec. |
|---|---|
| 44 | <0.2 |
| 45 | 0.30 |
| 42 | 0.40 |

TABLE 8-continued

| Sample | Gurley Value sec. |
|---|---|
| 27 | <0.2 |
| 26 | <0.2 |

With reference to Table 8, the Gurley value was less than 1 second for the various filters using both calendered and uncalendered webs.

Example 5

Webs according to Samples 20 (coconut-based carbon loaded web) and 26 (cation exchange loaded web) of Example 1 were assembled into filters as follows. These test samples were made by adhesively bonding a 100 mm diameter disk of loaded web media along the inside edge of a 100 mm OD plastic ring with a 94 mm ID opening. A fine bead of hot melt adhesive was added around the circumference of the 100 mm diameter disk of loaded web media. Another 100 mm disk was stacked directly on top of the previous layer (with adhesive). This layering was repeated for seven layers of the carbon loaded web, followed by the targeted layers of ion exchange loaded web, and then 3 more layers of the carbon loaded web. Another plastic ring was adhesively bonded to the top of the media stack. Stacked filters using loaded webs were assembled according to Table 9.

TABLE 9

| Sample | Layers Carbon Web | Grams of Carbon Web | Layers Ion Exchange Web | Grams of Ion Exchange Web | Grams Total Media |
|---|---|---|---|---|---|
| 46 | 10 | 56.55 | 2 | 12.16 | 68.71 |
| 47 | 10 | 56.01 | 3 | 20.49 | 76.50 |
| 48 | 10 | 55.13 | 4 | 27.35 | 82.48 |

Example 6

Testing

The filters of Example 5 were evaluated for TTHM reduction and for gravity flow through rates.

For the NSF/ANSI 53 TTHM Reduction Test, the total trihalomethane or TTHM reduction of the filter was assessed by first conditioning the filter by pouring 5 gallons (18.9 liters) of the appropriate NSF/ANSI general test water through the filter. The filters were tested using a chloroform influent challenge water, 450+/−90 ppb under gravity flow conditions. The data reported below was collected using the pour through device conditions (gravity flow) as described in the ANSI 53 Standard.

TABLE 10

| Sample | Gallons passed (liters) | Influent (ppb) | Effluent (ppb) | % Reduction |
|---|---|---|---|---|
| 46 | 0 | 397 | 1.36 | 99.7 |
|  | 10 (38) | 475 | 18.5 | 96.1 |
|  | 20 (76) | 414 | 30.5 | 92.6 |
|  | 30 (114) | 352 | 21.7 | 93.8 |
|  | 40 (151) | 424 | 39.4 | 90.7 |
|  | 50 (189) | 470 | 66.6 | 85.8 |
|  | 60 (227) | 511 | 57.2 | 88.8 |
|  | 70 (265) | 465 | 78.6 | 83.1 |
|  | 80 (303) | 397 | 102.7 | 74.1 |
| 47 | 0 | 397 | 6.47 | 98.4 |
|  | 10 (38) | 475 | 20.2 | 95.7 |
|  | 20 (76) | 414 | 26.2 | 93.7 |
|  | 30 (114) | 352 | 28.1 | 92.0 |
|  | 40 (151) | 424 | 43.3 | 89.8 |
|  | 50 (189) | 470 | 40 | 91.5 |
|  | 60 (227) | 511 | 58.5 | 88.6 |
|  | 70 (265) | 465 | 81.7 | 82.4 |
|  | 80 (303) | 397 | 102.7 | 74.1 |

With reference to Table 10, Samples 46 and 47 met the NSF 53 TTHM criteria for 60 gallons (227 liters) and 70 gallons (265 liters) respectively based on a maximum effluent concentration of 80 ppb chloroform allowed. These results for TTHM removal indicate an improvement for gravity filtration on a gallons treated/gram of carbon basis. A comparative Brita OB01/OB03 Classic style pitcher requires approximately 150 grams of active media to meet a minimum of 80 gallons (303 liters) on test. This is in comparison to samples 46 and 47, which contained 68-77 grams of active media. In addition, the flow rate was approximately 4 times faster for samples 46 and 47 as compared to the Brita product.

For the gravity flow through rates, incremental time required for each gallon of solution to pass through the filters of Example 5 was measured.

TABLE 11

|  | Gal. 1 (min) | Gal. 2 (min) | Gal. 3 (min) | Gal. 4 (min) | Gal. 5 (min) | Gal. 10 (min) | Gal. 20 (min) | Gal. 30 (min) | Gal. 40 (min) | Avg. Fill Time (min) |
|---|---|---|---|---|---|---|---|---|---|---|
| 46 | 7.08 | 6.00 | 6.55 | 6.17 | 6.15 | 6.30 | 6.08 | 6.23 | 6.28 | 6.32 |
| 48 | 8.70 | 7.42 | 7.27 | 7.40 | 7.35 | 8.25 | 8.85 | 11.08 | 9.40 | 8.41 |

For comparison purposes, the Brita OB01/OB03 Classic is reported to typically require 15 minutes to pass 0.5 gallons (1.9 liters). The PUR Ultimate pitcher filter is reported to take about 15 minutes to filter enough water to fill an 8-10 cup carafe.

Example 7

Certain samples of Examples 1 and 2 were assembled into filters as follows. A carbon block having dimensions of 8" L×1.125" OD×0.7" ID was made using the process described in U.S. Pat. No. 7,112,272 (Hughes et al.). The composition of the block was 20% Aquaguard 80×325 activated carbon and 80% polyethylene binder. Particle loaded web material was rolled around the carbon block until the resulting structure was approximately 3 inch (7.6 cm) OD. The 8 inch (20 cm) section was cut to a final length of 5 inch (13 cm) for test purposes. End caps were adhesively bonded to both ends of the composite structure.

A comparison product, referred to as "Comparison 5" is contains 70% active media and 30% polymer binder. End caps were adhesively bonded directly to the both ends of the carbon block.

Example 8

Testing

Filters formed according to Example 7 were evaluated for chloramine reduction according to NSF/ANSI 42 Chloramine Reduction Test. Maximum effluent concentration according to this standard is 0.5 ppm. Comparison 5 was also tested.

TABLE 12

| Comparison 5 | | Sample 26 Gal | | Sample 42 Gal | | Sample 43 Gal | |
|---|---|---|---|---|---|---|---|
| Gal (liter) | ppm | (liter) | ppm | (liter) | ppm | (liter) | ppm |
| 40 (151) | 0.00 | 15 (57) | 0.00 | 14.994 (57) | 0.00 | 15 (57) | 0.00 |
| 107 (405) | 0.01 | 70 (265) | 0.06 | 85.68 (324) | 0.00 | 76 (288) | 0.00 |
| 206 (780) | 0.12 | 180 (681) | 0.29 | 172.431 (653) | 0.00 | 177 (670) | 0.01 |
| 313 (1184) | 0.22 | 284 (1075) | 0.55 | 289.17 (1095) | 0.01 | 285 (1079) | 0.03 |
| 411 (1555) | 0.46 | 394 (1492) | 0.84 | 383.418 (1451) | 0.03 | 386 (1461) | 0.10 |
| 502 (1900) | 0.67 | 499 (1890) | 1.10 | 502.299 (1901) | 0.12 | 480 (1817) | 0.21 |
| 578 (2188) | 0.67 | 569 (2154) | 1.05 | 570.843 (2161) | 0.15 | 555 (2101) | 0.23 |
| 907 (3433) | 0.83 | 895 (3388) | 1.29 | 898.569 (3402) | 0.25 | 887 (3358) | 0.38 |
| 1271 (4811) | 1.22 | 1275 (4826) | 1.64 | 1290.56 (4885) | 0.63 | 1258 (4762) | 0.71 |
| | | | | 1510.11 (5716) | 0.74 | 1481 (5606) | 0.85 |
| | | | | 1627.92 (6162) | 0.84 | 1605 (6076) | 0.97 |
| | | | | 1698.61 (6430) | 0.93 | 1670 (6322) | 1.10 |

With reference to Table 12, Samples 42 and 43, which were calendered, permitted more than twice the amount of test liquid through the filters as compared to Comparison 5 while staying below 0.5 ppm chloramine.

Example 9

Directly formed cylindrical filters were formed from meltblown webs. Metallocene-catalyzed polypropylene sold under the trade name Vistamaxx 2125 (available from ExxonMobil) was extruded through a 10 inch (2.5 cm) wide drilled orifice die (DOD) at 6.5 lb/hr (2.9 kg/hr). The melt temperature was about 265° C. for all samples. The die to collector distance was 12 inch (30.5 cm). A base web sample (no loaded particulates) was collected and characterized to document the conditions. The base web had a basis weight of 53 gsm. The thickness was 0.014 inches (0.355 mm). A pressure drop of 0.55 mm $H_2O$ was measured at room temperature (approximately 22° C.) at one atmosphere ambient pressure with a uniform face velocity of 5.3 cm/sec for the air flow. These conditions correspond to an effective fiber diameter (EFD) of 19 microns according to the method set forth in Davies, C. N., "The Separation of Airborne Dust and Particles," Institution of Mechanical Engineers, London Proceedings 1B, 1952.

After reaching the targeted effective fiber diameter, the particulate was added to the particle loader hopper and the feed roll speed adjusted to deliver approximately 90 percent by weight of coconut-based activated carbon 60×140 sold under the trade name Pica NC506. The air pressure into the particle loader hopper was set at about 2.5 psig to provide a uniform distribution of particles throughout the web.

After verification of the conditions, the particle-loaded meltblown or blown microfiber (BMF) filaments were collected on a rigid tube having approximate dimensions of 1.45 inch (3.7 cm) OD and 13.9 inch (35.2 cm) length. The tube contained openings of approximately 0.15 inch (0.38 cm) square throughout the tube. This tube was mounted on a shaft and held in place by two rubber stoppers that slid along the shaft. This shaft was mounted in a chuck of a variable speed hammer drill that was operated at the maximum setting of 850 rpm. Paired spacers extended 4 inch (10 cm) from the collector surface to provide a reproducible distance from the die to the mandrel. The mandrel shaft could be held lightly against these spacers (on either end of the tube) as the samples were collected. The tube and shaft were allowed to reach full rotational speed and then passed into the particle loaded meltblown or blown microfiber (BMF) filaments airstream. The collection time was varied to adjust the weight of the particle loaded filaments collected on the tube. The core had a weight in the full length samples of 37 g. The weight of each core was measured before and after collection to account for variation related to contacting the mandrel with the particle loaded filament airstream.

TABLE 13

| | Full Length Sample | | | Sample 8 inch (20 cm) length | | |
|---|---|---|---|---|---|---|
| Sample | Collection Time sec. | Media wt. g | Media wt. g | Media wt. g | Max. OD in. (cm) | Min. OD in. (cm) |
| 49 | 23 | 270 | 233 | 196.36 | 2.99 (7.60) | 2.81 (7.14) |
| 50 | 6 | 87 | 50 | 44.95 | 1.82 (4.62) | 1.79 (4.55) |
| 51 | 15 | 157 | 120 | 102.04 | 2.46 (6.25) | 2.33 (5.92) |
| 52 | 15 | 183 | 146 | 116.39 | 2.53 (6.43) | 2.44 (6.20) |
| 53 | 15 | 144 | 107 | — | ~2.3 (5.8) | — |
| 54 | 15 | 211 | 174 | 139.86 | 2.62 (6.65) | 2.58 (6.55) |
| 55 | 15 | 185 | 148 | 125.30 | 2.69 (6.83) | 2.17 (5.51) |
| 56 | 23 | 233 | 196 | — | ~2.7 (6.86) | — |
| 57 | 23 | 220 | 183 | 154.19 | 2.72 (6.91) | 2.53 (6.42) |
| 58 | 23 | 213 | 176 | 148.11 | 2.61 (6.63) | 2.47 (6.27) |

Example 10

Testing

Some filters formed according to Example 9 were evaluated according to performance tests, including initial flush turbidity, pressure drop, and chlorine reduction.

For initial flush turbidity, testing occurred as described in Example 4.

TABLE 14

| Sample | 1st Liter (NTU) | 1 Gal. (NTU) | 5 Gal. (NTU) | 10 Gal. (NTU) | 25 Gal. (NTU) | 50 Gal. (NTU) | 100 Gal. (NTU) |
|---|---|---|---|---|---|---|---|
| 49 | 8 | 2.9 | 0.35 | 0.41 | 0.12 | 0.13 | 0.15 |
| 51 | 45.7 | 1.1 | 0.42 | 0.23 | 0.33 | 0.14 | 0.17 |
| 52 | 18.7 | 2.7 | 0.51 | 0.11 | 0.26 | 0.12 | 0.15 |
| 54 | 8.7 | 2.9 | 0.51 | 0.32 | 0.15 | 0.26 | 0.19 |

The initial flush turbidity of Samples 49, 51, 52, and 54 were greater than that of Comparison 1 shown in Table 3, but were less than that of Comparison 2 in Table 3. Initial flush turbidity improved as the OD of the cylinder increased. In all cases, the turbidity reduced to levels of less than 0.5 NTU.

For clean pressure drop, testing occurred as described in Example 4. A cylinder having no loading is "Comparison 6."

TABLE 15

| Sample No. | 0.25 gpm psi | 0.50 gpm psi | 0.75 gpm psi | 1.0 gpm psi | 2.0 gpm psi | 3.0 gpm psi | 4.0 gpm psi |
|---|---|---|---|---|---|---|---|
| Comparison 6 | <2 | <2 | 2 | 4 | 16 | 32 | 57 |
| 49 | 0.5 | 1.5 | 3 | 5 | 18 | 39 | 64 |
| 51 | 0.5 | 1 | 3 | 5 | 18 | 39 | 65 |
| 52 | 0 | 1.5 | 2.5 | 5 | 19 | 38 | 64 |
| 54 | 1 | 1.5 | 3 | 6 | 18 | 38 | 66 |

The clean pressure drop of these filters was low and such filters would be advantageous for whole house filtration applications.

For NSF/ANSI 42 Chlorine Reduction Test, testing occurred as described in Example 4.

TABLE 16

| Sample No. | After 15 gal % Red. | ~1100 gal % Red. | ~2300 gal % Red. | ~3800 gal % Red. | ~4200 gal % Red. | ~5000 gal % Red. | ~8000 gal % Red. |
|---|---|---|---|---|---|---|---|
| 50 | 91.8 | 76.1 | 50.2 | 32.8 | 35.2 | 38.5 | 26.7 |
| 55 | 98.6 | 98.4 | 94.5 | 90.1 | 90.0 | 91.8 | 80.2 |
| 57 | 97.1 | 97.4 | 97.2 | 98.0 | 97.6 | 96.2 | 93.6 |
| 58 | 97.6 | 98.9 | 97.2 | 99.0 | 98.1 | 95.2 | 91.7 |

With reference to Table 16, all samples removed acceptable levels of chlorine for at least 2300 gallons on test based on a minimum reduction of 50% required by the standard. The gallons of water treated were directly related to the mass of the amount of active media. Sample 57 performed the best and was still reducing >90% of the influent challenge even after 8000 gallons. This is surprising due to the particle size of the carbon used and the low pressure drop of the structure.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A filter element comprising:
   a porous article comprising a web of self-supporting nonwoven polymeric fibers and a plurality of sorbent particles enmeshed in the web, the article comprising a first surface and a second surface;
   a liquid-impermeable housing surrounding the porous article;
   an inlet in fluid communication with the first surface; and
   an outlet in fluid communication with the second surface;
   wherein the web has a Gurley time of no more than 2 seconds.

2. The filter element of claim 1, wherein the sorbent particles comprise an activated carbon, diatomaceous earth, an ion exchange resin, a metal ion exchange sorbent, an activated alumina, an antimicrobial compound, an acid gas adsorbent, an arsenic reduction material, an iodinated resin, or combinations thereof.

3. The filter element of claim 1 having a pressure drop of no more than 150 mm water at a uniform face velocity of air of 5.3 cm per second under ambient conditions.

4. The filter element of claim 1, wherein the particles have an average particle size of no more than 250 μm.

5. The filter element of claim 1 having an average gravity flow through rate of less than 10 minutes per gallon.

6. The filter element of claim 1, wherein the web is wound to form the article.

7. The filter element of claim 1, wherein the article is formed from a plurality of webs adjacent to each other.

8. The filter element of claim 7, wherein a first web contains a first sorbent and a second web contains a second sorbent.

9. The filter element of claim 7, wherein a first web comprises particles of a first average size and a second web comprises particles of a second average size.

10. The filter element of claim 1, wherein the web substantially surrounds a core.

11. The filter element of claim 10, wherein the core comprises a carbon block.

12. The filter element of claim 1, wherein a base web weight is in the range of 9 to 1000 grams per square meter.

13. The filter element of claim 1, wherein the web has a sorbent particle density in the range of 0.20 to 0.5 g/cc.

14. The filter element of claim 1, wherein the polymeric fibers comprise polypropylene.

15. The filter element of claim 1, wherein the polymeric fibers comprise a metallocene-catalyzed polyolefin.

16. The filter element of claim 12, wherein the polypropylene has a polymer melt flow index in the range of 30 to 1500.

17. The filter element of claim 1, wherein the web has been compressed by calendering, heating, or applying pressure.

18. The filter element of claim 1 having a sorbent particle density gradient.

19. A fluid filtration system comprising a fluid source and a filter element, the filter element comprising:
- a porous article comprising a web of self-supporting nonwoven polymeric fibers and a plurality of sorbent particles enmeshed in the web, the porous article comprising a first surface and a second surface;
- a liquid-impermeable housing surrounding the porous article,
- an inlet in fluid communication with the first surface; and
- an outlet in fluid communication with the second surface;
- wherein the web has a Gurley time of no more than 2 seconds.

20. The filter element of claim 19, wherein the web is rolled to form the porous article.

21. The filter element of claim 19, wherein the porous article is formed from a plurality of webs that are adjacent to each other.

22. The filter element of claim 19, wherein the web substantially surrounds a carbon block.

23. A filter element comprising:
- a carbon block composite comprising an activated media in an amount in the range of 10 to 90% and a binder in an amount in the range of 10 to 90% by weight of the block;
- a web surrounding the carbon block composite, the web comprising self supporting nonwoven polypropylene fibers and a plurality of sorbent particles enmeshed in the web in an amount in the range of 50 to 97% by weight of the web.

24. A filter element comprising a plurality of disks affixed to each other, the disks comprising self-supporting nonwoven polypropylene fibers and a plurality of sorbent particles enmeshed in the fibers; wherein the plurality of disks has a Gurley time of no more than 2 seconds.

25. The filter element of claim 24, wherein a first plurality of disks comprise first sorbent particles of activated carbon and a second plurality of disks comprise second sorbent particles of ion exchange resin.

26. A method of filtering a fluid, the method comprising contacting a filter element with the fluid, the filter element comprising a porous article comprising a web of self-supporting nonwoven polymeric fibers and a plurality of sorbent particles enmeshed in the web, the porous article comprising a first surface and a second surface; a liquid impermeable housing surrounding the porous article, an inlet in fluid communication with the first surface; and an outlet in fluid communication with the second surface.

* * * * *

UNITED STATES PATENT AND TRADEMARK OFFICE
CERTIFICATE OF CORRECTION

PATENT NO.         : 7,828,969 B2                                                        Page 1 of 1
APPLICATION NO.    : 11/835196
DATED              : November 9, 2010
INVENTOR(S)        : Bradley W Eaton It is certified that error appears in the above-identified patent and that said Letters Patent is hereby corrected as shown below:

<u>Column 6</u>
Line 26, delete "theological" and insert -- rheology --, therefor.

<u>Column 24</u>
Line 54, in Claim 12, delete "9" and insert -- 10 --, therefor.

Signed and Sealed this
Twenty-first Day of June, 2011

David J. Kappos
*Director of the United States Patent and Trademark Office*